(12) United States Patent
Garcia et al.

(10) Patent No.: US 7,206,522 B2
(45) Date of Patent: Apr. 17, 2007

(54) DYNAMIC MEASUREMENT OF AND COMPENSATION FOR IMPAIRMENTS TO OPTICAL DATA COMMUNICATION PULSES

(75) Inventors: Hernando Garcia, Freehold, NJ (US); Daniel Charles Kilper, Fair Haven, NJ (US); Jeffrey Matthew Roth, Lexington, MA (US); Chunhui Xu, Piscataway, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 723 days.

(21) Appl. No.: 10/128,939

(22) Filed: Apr. 24, 2002

(65) Prior Publication Data

US 2003/0202795 A1   Oct. 30, 2003

(51) Int. Cl.
  *H04B 10/06* (2006.01)
(52) U.S. Cl. ........................ 398/206; 398/207; 398/213
(58) Field of Classification Search ........ 398/147–148, 398/202–214; 356/317, 450; 436/518; 359/326, 359/359
See application file for complete search history.

(56) References Cited

U.S. PATENT DOCUMENTS

| | | | |
|---|---|---|---|
| 5,991,021 A * | 11/1999 | Mukherjee et al. | ......... 356/317 |
| 6,111,641 A * | 8/2000 | Mukherjee et al. | ......... 356/317 |
| 6,195,167 B1 * | 2/2001 | Reid et al. | ................... 356/450 |
| 6,356,381 B1 * | 3/2002 | Schade et al. | .............. 359/326 |
| 2001/0021534 A1 * | 9/2001 | Wohlstadter et al. | ....... 436/518 |
| 2002/0167254 A1 * | 11/2002 | Craig et al. | ............. 313/103 R |
| 2005/0122530 A1 * | 6/2005 | Denk et al. | ................. 356/609 |

OTHER PUBLICATIONS

Reid et al. Commercial semiconductor device for two photon absorption auto-correlation of ultrashort light pulses, Optics and Photonics News vol. 9, No. 5, May 1998.*

* cited by examiner

*Primary Examiner*—Dzung Tran
(74) *Attorney, Agent, or Firm*—Barry H. Freedman

(57) ABSTRACT

A photomultiplier module (PMT), preferably a PMT with a gallium arsenide (GaAs) photocathode, is used as a N-photon detector (N is an integer $\geq 2$). The PMT detects the N-photon absorption rate of an optical signal having a wavelength range extending from 1.0 μm to an upper wavelength region that increases as the number of photons simultaneously absorbed by the PMT increases beyond two. The N-photon absorption rate is used by a signal compensation apparatus to reduce impairments which affect the rate, such as group velocity dispersion and/or polarization mode dispersion, in a received optical pulse communication signal. The N-photon absorption rate can also be used to determine the optical signal-to-noise ratio of a received optical pulse communication signal, and/or to synchronize a second optical pulse signal with the first optical signal.

15 Claims, 8 Drawing Sheets

DYNAMIC MEASUREMENT OF AND COMPENSATION FOR IMPAIRMENTS TO OPTICAL DATA COMMUNICATION PULSES

TECHNICAL FIELD OF THE INVENTION

This invention relates to the measurement and compensation of distortion to optical data pulses, and more particularly to the dynamic measurement and real-time compensation of distortion to optical data pulses using a GaAs photomultiplier.

BACKGROUND OF THE INVENTION

Optical communications systems operating at high bit rates, such as at 10 Gb/s, 40 Gb/s or at even higher emerging bit-rates, have stringent requirements on the characteristics of the optical pulses that are communicated using such systems. Impairments to the pulse stream caused by group velocity dispersion (GVD), polarization mode dispersion (PMD), and other undesired effects can severely degrade these systems. The ability to affordably and dynamically measure these time-varying impairments, either for monitoring or compensating purposes, adds attractive functionality to a transmission network using these systems. The need for these techniques exists at the transmitter, receiver and at individual repeater locations throughout the network.

SUMMARY OF THE INVENTION

In accordance with the present invention, a photomultiplier module (PMT), preferably a PMT with a gallium arsenide (GaAs) photocathode, is used as a N-photon detector (N is an integer $\geq 2$). Preferably, the PMT uses a photocathode material that exhibits strong 2- (or more) photon absorption, but negligible 1-photon absorption, within the wavelength region of interest, which, for optical communications, is generally in the region between 1 to 2 microns. The N-photon absorption response of the PMT determines the characteristics of an optical pulsed communication signal.

In a first embodiment, a GaAs photomultiplier module (PMT) is used as a 2-photon detector in the wavelength region of approximately 1.0 μm to 1.8 μm, for determining optical pulse characteristics using the rate at which two-photon absorption (TPA) of the communication signal is detected by the PMT.

The present invention has numerous applications. In one specific application of our invention, a TPA rate is utilized by a signal compensation apparatus for real-time compensation of a received optical pulsed communication signal subjected to group velocity dispersion, polarization mode dispersion, or other signal impairment phenomena which affect the two-photon absorption (TPA) response.

In another application of our invention, the TPA rate is used to determine the optical signal-to-noise ratio (OSNR) of a received optical pulsed communication signal. Yet another application uses the TPA rate to synchronize a second optical pulse signal to a first optical pulse signal. Yet another application uses the TPA rate in a PMT as a part of an optical clock recovery circuit.

The present invention also contemplates a method for determining a characteristic of an input optical pulsed communication signal, comprising the steps of receiving the optical signal and applying the optical signal to a GaAs photomultiplier tube (PMT), and detecting at least two-photon absorption (TPA), in which the optical signal has a wavelength range extending from 1.0 μm to an upper wavelength region that increases as the number of photons simultaneously absorbed by the PMT increases beyond two.

BRIEF DESCRIPTION OF THE DRAWINGS

The present invention will be more fully appreciated by consideration of the following detailed description, which should be read in light of the drawing in which.

DETAILED DESCRIPTION

The present invention is enabled by applicant's recognition of the ability of a photomultiplier having a photocathode material that exhibits strong 2- (or more) photon absorption, but negligible 1-photon absorption, within the wavelength region of interest, preferably a GaAs photomultiplier module (PMT), to measure 2-photon absorption (TPA) at record-low power in the 1.5 μm region. Persons skilled in the art will recognize that the present invention can easily, if desired, be extended to encompass N-photon absorption, where N is an integer greater than or equal to 2. As used herein, a photomultiplier module (PMT) includes a traditional photomultiplier tube, together with a built-in high voltage supply, an amplifier, and possibly other associated electronics. For comparison purposes, reference is made to co-pending patent application entitled "Dynamic measurement of and compensation for impairments to optical data communication pulses using a photon-counting silicon avalanche photodiode" Ser. No. 10/099,180, filed on Mar. 16, 2002 on behalf of W. H. Knox, J. Roth and C. Xu and assigned to the same assignee as the present invention, which describes a different technique for performing measurements using a silicon avalanche photodiode.

Figure 1:
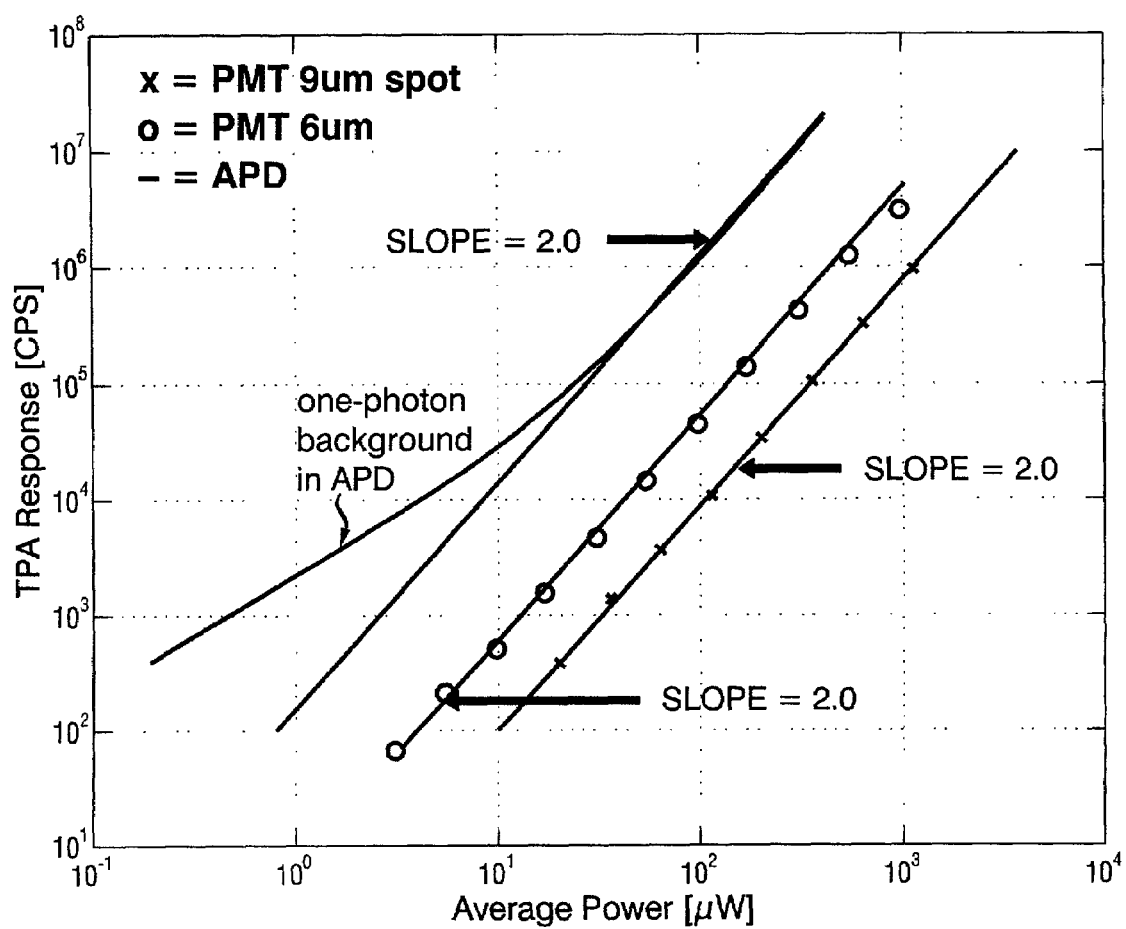
FIG. 1 is a graph, which illustrates the low level of signal power needed for two-photon absorption (TPA) with a GaAs photomultiplier module (PMT) in accordance with the present invention, and compares the PMT response to that of a silicon photon counting APD.

The low signal power requirement for achieving TPA with a GaAs photomultiplier is due to the high gain (~$10^6$) of the PMT and ultra-low background noise (typically less than few hundred counts per second). This is illustrated in FIG. 1, which is a graph that shows two-photon absorption (TPA, slope=2) responses of a PMT (in counts per second—CPS) at different incident power levels (focal spot sizes, 6 and 9 µm) of a 1.58 µm continuous wave (CW) laser. Note that even at the lowest laser power used (~3 µW), the slope in the log-log plot is about 2.0 (slope=2), indicating that two-photon absorption (TPA) contribution dominates and one-photon contribution is negligible. For comparison, FIG. 1 also shows the response of a silicon avalanche photodiode, as presented in a publication by Chris Xu, Jeffrey M. Roth, Wayne H. Knox, Keren Bergman, "Ultra-sensitive autocorrelation of 1.5 µm light with single photon counting silicon avalanche photodiode;" Electronics Letters, Jan. 17, 2002, vol. 38, No. 2, pp. 86–88, where one-photo absorption dominates at power levels below 20 µW. Thus, the one-photon background in our GaAs PMT is significantly less than any devices that have been previously reported. See also, T. Hattori, Y. Kawashima, M. Daikoku, H. Inouye and H. Nakatsuka, "Autocorrelation measurement of femtosecond optical pulses based on two-photon photoemission in a photomultiplier tubes", *Japanese Journal of Applied Physics,* Aug. 1, 2000, vol 39, Part 2, No. 8A, pp. 809–81; K. Kikuchi; "Highly sensitive interferometric autocorrelator using Si avalanche photodiode as two-photon absorber"; *Electronics Letters,* Jan. 8, 1998, vol. 34, No. 1, pp. 123–125; and K. Kikuchi; "Optical sampling system at 1.5 µm using two photon absorption in Si avalanche", *Electronics Letters, Jun.* 25, 1998, vol. 34, No. 13, pp. 1354–1355.

Measurement of Impairments Affecting Pulse Width

Because the TPA rate is inversely proportional to pulse width, as shown in equation (1) below, we have recognized that TPA is an attractive candidate for implementing dynamic measurement and compensation of impairments affecting pulse width. This expression for the number of two-photon absorption events, $H_{TPA}$ is shown in eq. (1) in terms of average power (P), pulsewidth ($T_0$), average pulse repetition period ($T_R$) and the conversion efficiency η:

$$H_{TPA} = \eta P^2 T_R / T_O \quad (1)$$

The low power requirement for achieving TPA with a GaAs photomultiplier means that only a small amount of power is needed to characterize the pulse width at any point in an optical link. Furthermore, TPA can be achieved in a simple direct-detection configuration, involving no polarization dependent phase matching or expensive nonlinear crystals. The PMT device is also very compact, can be directly fiber-coupled and requires only a DC power supply.

Figure 2:
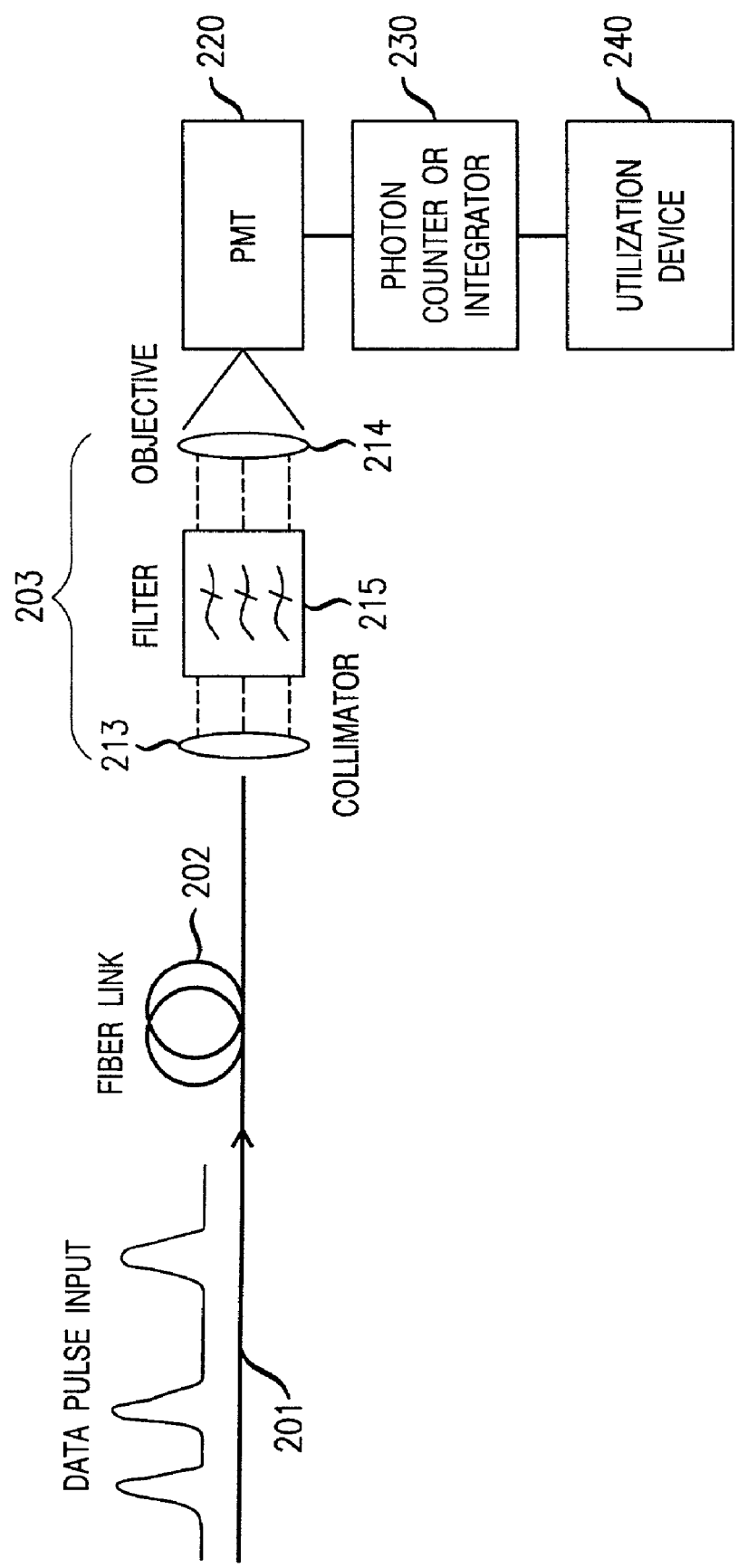
FIG. 2 shows a block diagram, in accordance with the present invention, of PMT apparatus arranged for the measurement of data pulse impairment in a fiber link.

Referring now to FIG. 2, there is shown a block diagram of PMT apparatus arranged in accordance with the present invention for the measurement of data pulse impairment in a return-to-zero data pulse train transmitted via an optical fiber link. Note that wavelength range of the optical pulse communication signal is in the range of 1.0–1.8 µm, so that the GaAs PMT operates in a regime where two-photon absorption occurs.

The apparatus of FIG. 2 utilizes an inline, direct-detection configuration to detect TPA of an optical pulse communication signal. The optical pulse communication signal is received at input 201 and passes through an optical fiber link unit 202 which, in a real world setting, will cause various types of signal degradation, which can be either (a) measured, and/or (b) reduced or eliminated, in accordance with our invention. For measurement purposes, the signal in fiber 202 is terminated in an output coupler shown generally at 203, which includes a first lens 213 for collimating the optical signal, a filter 215 for selecting a desired wavelength or channel in a wavelength division multiplexed (WDM) signal, and a second lens 214 for focusing the filter output onto a PMT 220. A photon counter or analog integrator 230 is coupled to PMT 220, to provide an output indicative of the TPA rate, i.e., TPA counts per second, occurring in PMT 220. The output of counter 230 is applied to a utilization device 240, which, as described more fully below, can be arranged to monitor or display the measured impairment(s), or use the measurements to control a system to reduce or eliminate the impairment(s).

The signal impairments occurring in fiber link 202 can be of several types, including noise that degrades the optical signal-to-noise ratio (OSNR) of the signal, impairments that cause group velocity dispersion (GVD), and impairments that cause polarization mode dispersion (PMD).

Figure 3A:
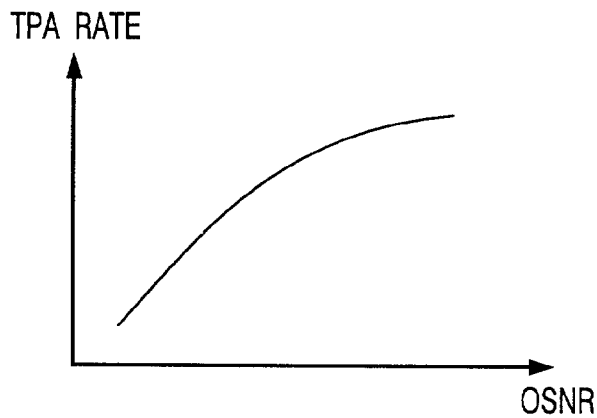
FIG. 3A shows the variation in TPA rates for data pulses having different optical signal-to-noise ratios (OSNR)

As illustrated in FIG. 3A, for a given average pulse power, the TPA rate is a direct measurement of the OSNR: a higher TPA rate or OSNR being indicative of a lower noise level. Thus, data pulses received at, for example, a 23 dB OSNR level (lower noise level) generate a higher TPA rate than at 15 dB OSNR.

Figure 3B:
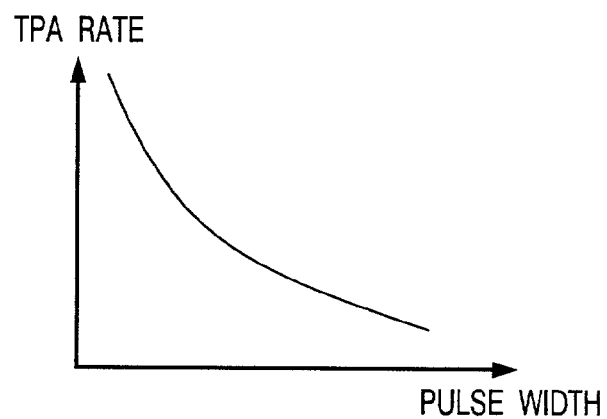
FIG. 3B shows the variation in TPA rates for data pulses having different pulse width.

FIG. 3B illustrates that the pulse width and the TPA rate are strictly related, such that a narrower pulse produces a higher TPA rate. Because system GVD directly affects the pulse width, the TPA rate serves as a good measure of the deterioration of pulse width caused by GVD.

Figure 3C:
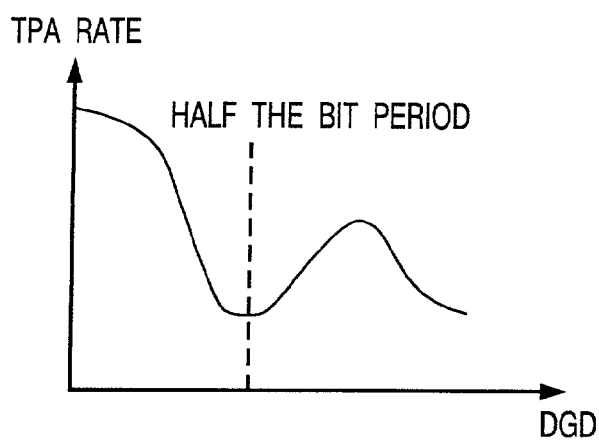
FIG. 3C shows the variation in TPA rates due to the broadening of data pulse width due to PMD.

In the FIG. 3C graph, the variation in PMT (i.e., TPA) rates is shown as a function of the differential group delay (DGD). DGD is a measure of the broadening of pulsewidth due to PMD. PMD causes different polarization of the data pulse to have different delays, and hence introduces pulse spreading and pulse distortion. As shown in FIG. 3C, as DGD increases, the pulse width increases and hence the PMT rate decreases until the pulses of the two different polarization start to cause overlap of adjacent pulses (at DGD values about half the bit-period, for example, at DGD=50 ps for 10 Gb/s pulse train). Thus, FIG. 3C illustrates that PMD affects pulse width directly, and that PMT rate is a good measure of the effect of PMD on pulse width.

Compensation of Impairments Affecting Pulse Width

The present invention can be used in several arrangements that provide dynamic compensation of impairments affecting pulse width. Generally speaking, these arrangements work by measuring the pulse width using the PMT rate. A control unit is arranged to continually monitor the PMT rate in real-time, and to generate a feedback signal that is used to control an impairment compensation device. The latter device corrects for the impairment, or at least keeps the impairment at a desired level. Two specific applications of the present invention provide compensation of GVD and PMD impairments, and are described below.

GVD Compensation

Figure 4:
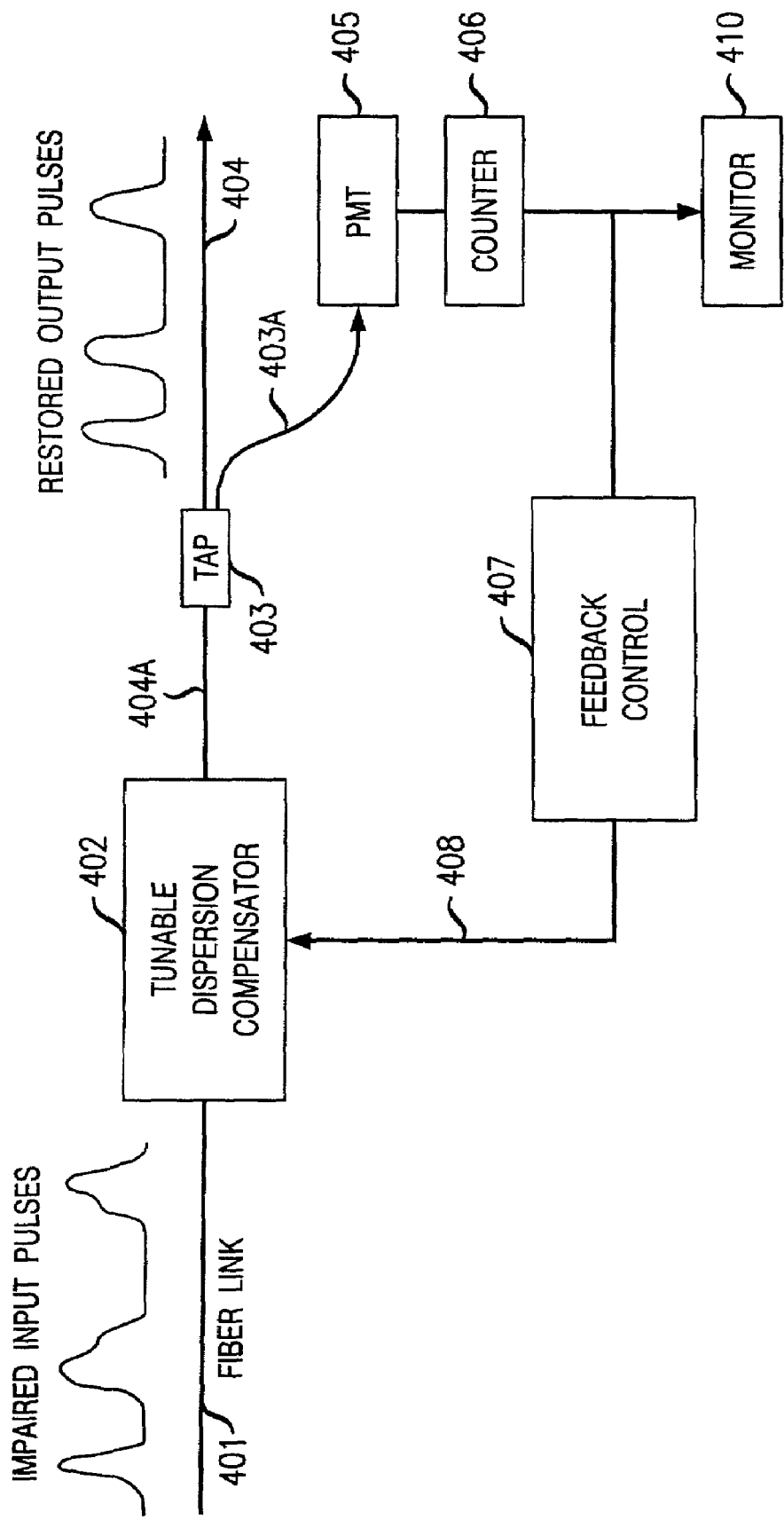
FIG. 4 shows apparatus in accordance with the present invention arranged to compensate an optical signal for GVD impairment.

Referring now to FIG. 4, there is shown arrangement of a feedback system using PMT rate to control GVD compensation. An "impaired" incoming optical data pulse train is received over an optical transmission link 401, such as an optical fiber. This data pulse train is sent through a tunable dispersion compensator (TDC) 402, that is arranged to apply variable amounts of net dispersion within an adjustment range, illustratively, ±500 ps/nm, based upon a control signal applied via a control input 408. The output of TDC 402 is applied via an optical fiber 404A, to a tap 403 (or signal-sampling device) that is arranged to divert onto output 403A, a small percentage of the light signal output from TDC 402. The balance of the output from TDC 402 is coupled to an output optical transmission link 404.

The signal from tap 403 is applied via an optical fiber 403A to PMT 405, the output of which is in turn applied to a counter 406 or other apparatus capable of quantifying the TPA response. As indicated previously, the electrical pulses from PMT 405 counted by counter 406 are directly indicative of TPA. The counter output, which may be applied to a monitor 410, may also be used to monitor GVD levels.

Advantageously, the high TPA sensitivity and gain of PMT 405 enables only a small amount of the power to be tapped (by tap 403) from the output light signal that exits from TDC 402. Note also that the connection between the output of TDC 402 and tap 403 is made using an optical fiber 404A, and that PMT 405 is selected to be optical fiber compatible, so the connection 403A from tap 403 to PMT 405 also is made using an optical fiber. The use of optical fiber connections 404A and 403A eliminates the need for collimation/filtering/focusing as was provided by output coupler 203 of FIG. 2.

The resulting TPA rate from counter 406 is applied to a feedback control unit 407, which is arranged to determine the appropriate feedback control signal applied to control input 408 of TDC 402. Specifically, this control signal controls the amount of dispersion compensation that TDC 402 applies to the received impaired pulse train to correct for the undesired dispersion (broadening or narrowing) and thereby produce the restored pulse train. The feedback control algorithm in feedback control unit 407 desirably works at a rate that is fast enough (for example, 1 to 1000 Hz) to continually adjust the amount of dispersion compensation produced by TDC 402 to maintain the desired level of dispersion in the restored pulse train on optical transmission link 404.

In the above illustrative arrangement, TDC 402 may be a tunable fiber Bragg grating, PMT 405 may be a Hamamatsu H7421-50 GaAs PMT, and counter 406 may be a well known electrical pulse counter device, preferably with a threshold (discrimination level) adjustment. Tap 403 can be any of several well known devices, as will be apparent to persons skilled in the art.

Feedback control unit 407 can utilize a processor and application software programmed to compare the received TPA rate to a predetermined TPA reference rate, which is associated with the desired dispersion level or pulse width of the restored output pulse train on transmission link 404. As a result of this comparison, feedback control unit 407 produces a control signal 408 that controls dispersion compensation provided by TDC 402 to produce the predetermined TPA reference rate. The result is that the GVD level (or pulse width) of the restored output pulse train on transmission link 404 is controlled at the desired GVD level.

PMD Compensation

Figure 5:
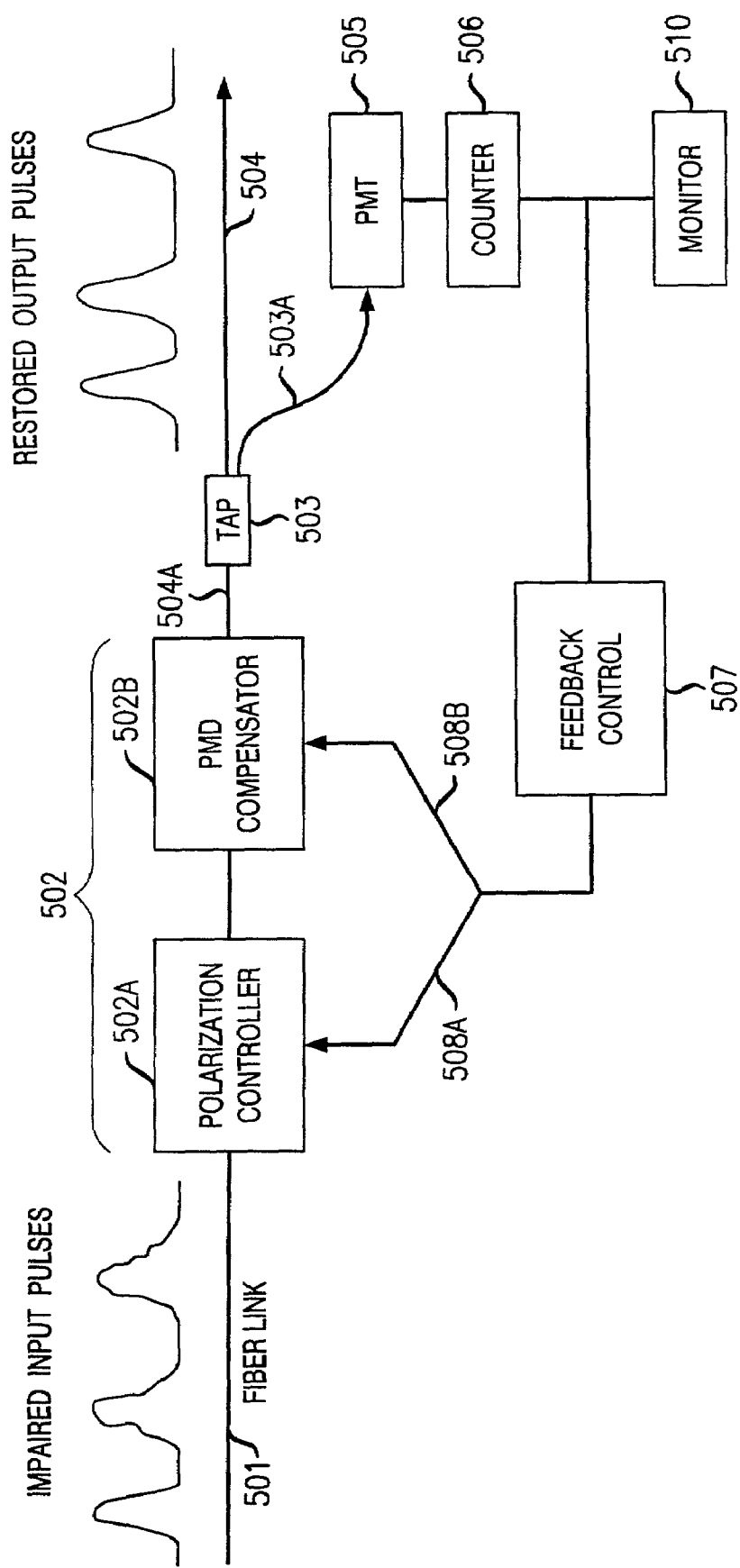
FIG. 5 shows apparatus in accordance with the present invention arranged to compensate an optical signal for PMD impairment.

Another application of the present invention, this one being directed to PMD compensation, is illustrated of FIG. 5. This arrangement differs from that of GVD compensation of FIG. 4 principally in the compensation technique utilized. Thus, elements 501, 503, 503A, 504, 504A, 505, and 506 of FIG. 5 operate in the same or an analogous manner as elements 401, 403, 403A, 404, 404A, 405, and 406 of FIG. 4, respectively. As shown in FIG. 5, a polarization compensation unit 502 can include a polarization controller 502A and a PMD compensator 502B. The impaired pulse train signal input via optical transmission link 501 includes vertical and horizontal polarization components (not shown). Polarization controller 502A adjusts the polarization state of the signal that is applied to PMD compensator 502B, under the control of a control signal on control input 508A. PMD compensator 502B is arranged to apply a variable amount of differential group delay (DGD) to the received (impaired) pulse train signal, depending upon a control signal on control input 508B. This arrangement therefore allows for first order and some second order PMD compensation.

Feedback control unit 507 is arranged to compare the received TPA rate generated by counter 506 in response to the output of PMT 505, to a predetermined TPA reference rate associated with a desired PMD level of the restored output pulse train on output optical transmission link 504. As result of this comparison, feedback control unit 507 produces control signal that control polarization controller 502A and PMD compensator 502B. The result is that the PMD level of the restored output pulse train on transmission link 504 is controlled at the desired PMD level. Note that, as in FIG. 4, the output of counter 506 may also be applied to a monitor 510 and used to monitor PMD levels.

GVD and PMD Compensation

Figure 6:
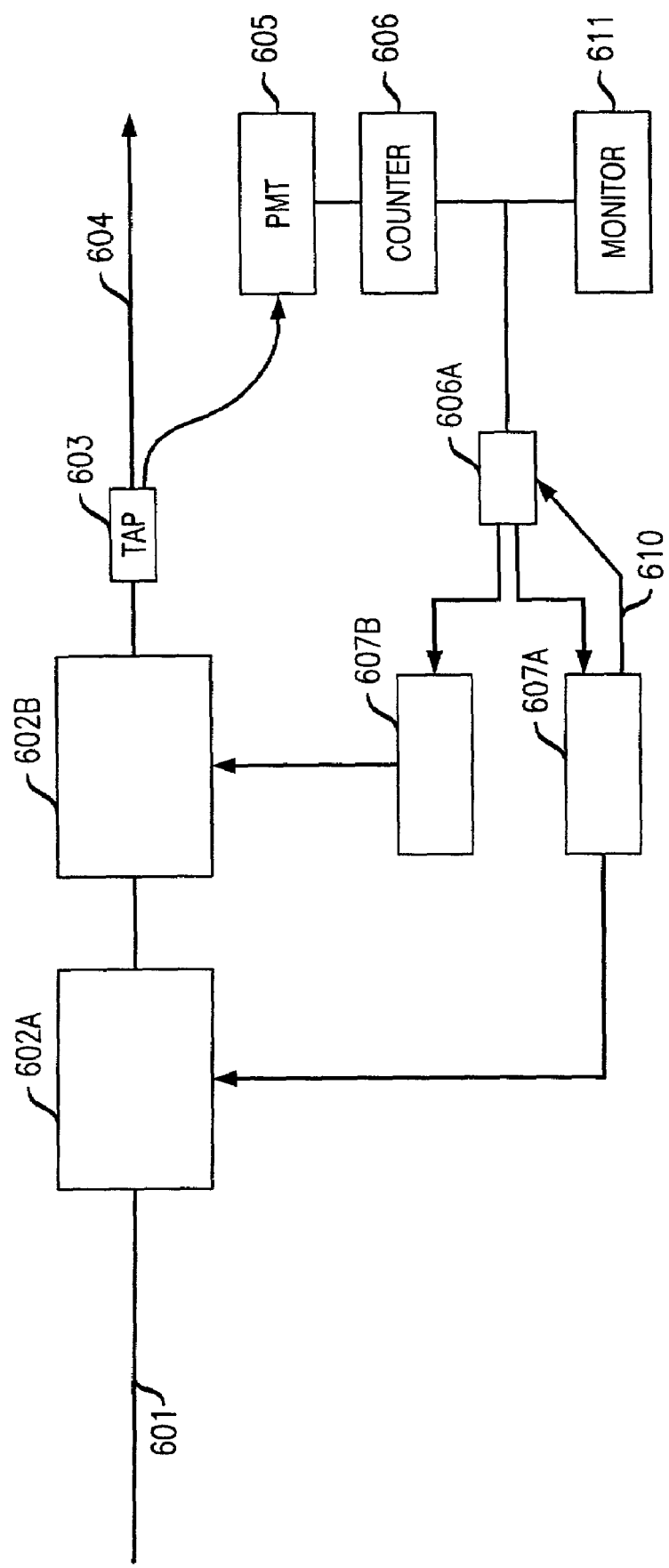
FIG. 6 shows apparatus in accordance with the present invention arranged to compensate an optical signal for both GVD and PMD impairment.

Referring now to FIG. 6, there is shown a signal compensation arrangement for providing both GVD and PMD compensation to an impaired input pulse train signal received over transmission link 601. As shown, a first compensation unit 602A is connected in series with a second compensation unit 602B, each of which can correct different impairments in the input optical signal. The first compensation unit 602A may be a GVD compensation unit similar to TDC 402 of FIG. 4, and the second compensation unit 602B may be a PMD compensation unit similar to compensation unit 502 of FIG. 5, or vice-versa Elements 601, 603, 605, and 606 of FIG. 6 operate in the same manner as the corresponding elements of FIG. 4.

In a preferred arrangement, compensation units 602A and 602B do not operate at the same time. Rather, they are alternately operated, so that after first compensation unit 602A has made its e.g., dispersion improvement, the second compensation unit 602B is operated to make its e.g., PMD improvement. The above process is repeated until a predetermined or desired level of dispersion and PMD improvement has been reached.

As an example, assume that compensation unit 602A is a GVD compensator unit as in FIG. 4, and compensation unit 602B is a PMD compensator unit as in FIG. 5. Illustratively, compensation unit 602A is the master unit and controls switch unit 606A, using a control signal 610 to select which of compensation unit 602A or compensation unit 602B is operating at any particular time. (Note a separate control unit may be used to select when each unit is to operate.) If compensation unit 602A is to operate, the TPA rate signal from counter 606 is sent to control unit 607A only. Both control units 607A and 607B know that the existence of a TPA rate signal from counter 606 is interpreted as a "start" signal and that an absence of a TPA rate signal is interpreted as a "stop" signal.

After control unit 607A has operated to obtain the desired level of GVD in the restored output signal, it sends a control signal to switch 606A, which in turn routes the TPA rate signal to control unit 607B, thereby enabling control unit 607B and disabling control unit 607A. In this iterative manner, the operation of control units 607A and 607B are sequentially operated until the desired level of distortion correction is reached in the restored output signal on output optical transmission link 604. Note that the output of counter 606 may also be used to monitor GVD levels.

It is to be noted here that the apparatus described in FIGS. 2, 4–6 may be incorporated not only as part of an optical transmitter, but also in repeaters and transceiver units, as well as in receiver units of an optical network. The invention can be used both to measure OSNR, GVD, and PMD and to compensate for GVD, and PMD impairments to optical signals.

Synchronization Using Coincident Pulse Detection

Figure 7:
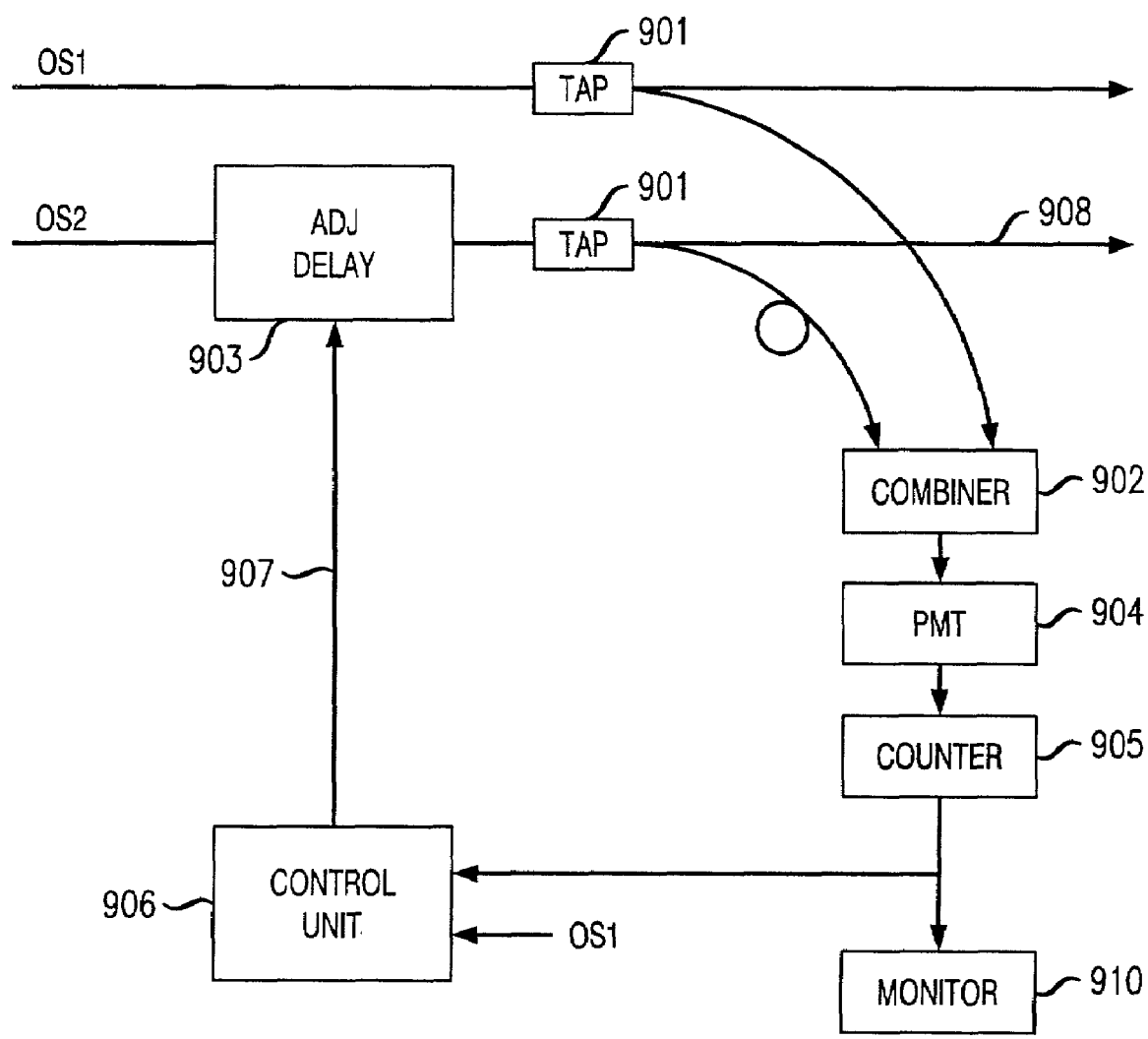
FIG. 7 shows PMT apparatus arranged in accordance with the present invention for synchronizing two optical data signals.

FIG. 7 shows yet another application of the present invention in which a PMT 904 and a counter 905 enable synchronization of two optical data pulse streams OS1 and OS2. This arrangement may, for example, be located at a data receiver where it may be desired to synchronize signal a local clock signal (OS2) with a received data signal (OS1).

A portion of the OS1 signal is split-off by tap 901 and applied to a first input of combiner 902. The OS2 signal passes through a variable delay circuit 903 and is applied to a second input of combiner 902. The combiner 902 combines the two input signals and applies them to PMT 904. Because the TPA rate measured in counter 905 is maximized when the modulation envelopes applied to the optical carrier of the OS1 and OS2 signals exhibit the same frequency and phase, the TPA rate in counter 905 is at a maximum when the OS1 and OS2 signals are coincident, i.e., when they are in synchronization. The TPA rate output from counter 905 is applied to a control unit 906, which includes a processor and control logic or software which generates an adjustable delay control signal on output 907, which controls the amount of delay that variable delay circuit 903 introduces to the OS2 signal. Control unit 906 is arranged to adjust the delay in variable delay circuit 903 so as to maximize the TPA rate from counter 905. Since a data pulse is not always present in OS1, the arrangement used in control unit 906 only considers the rate during the presence of a data pulse in OS1. Thus, when the delay in delay circuit 903 produces a maximum TPA rate, the output from delay circuit 903 is in synchronism with data pulses in OS1.

Figure 8:
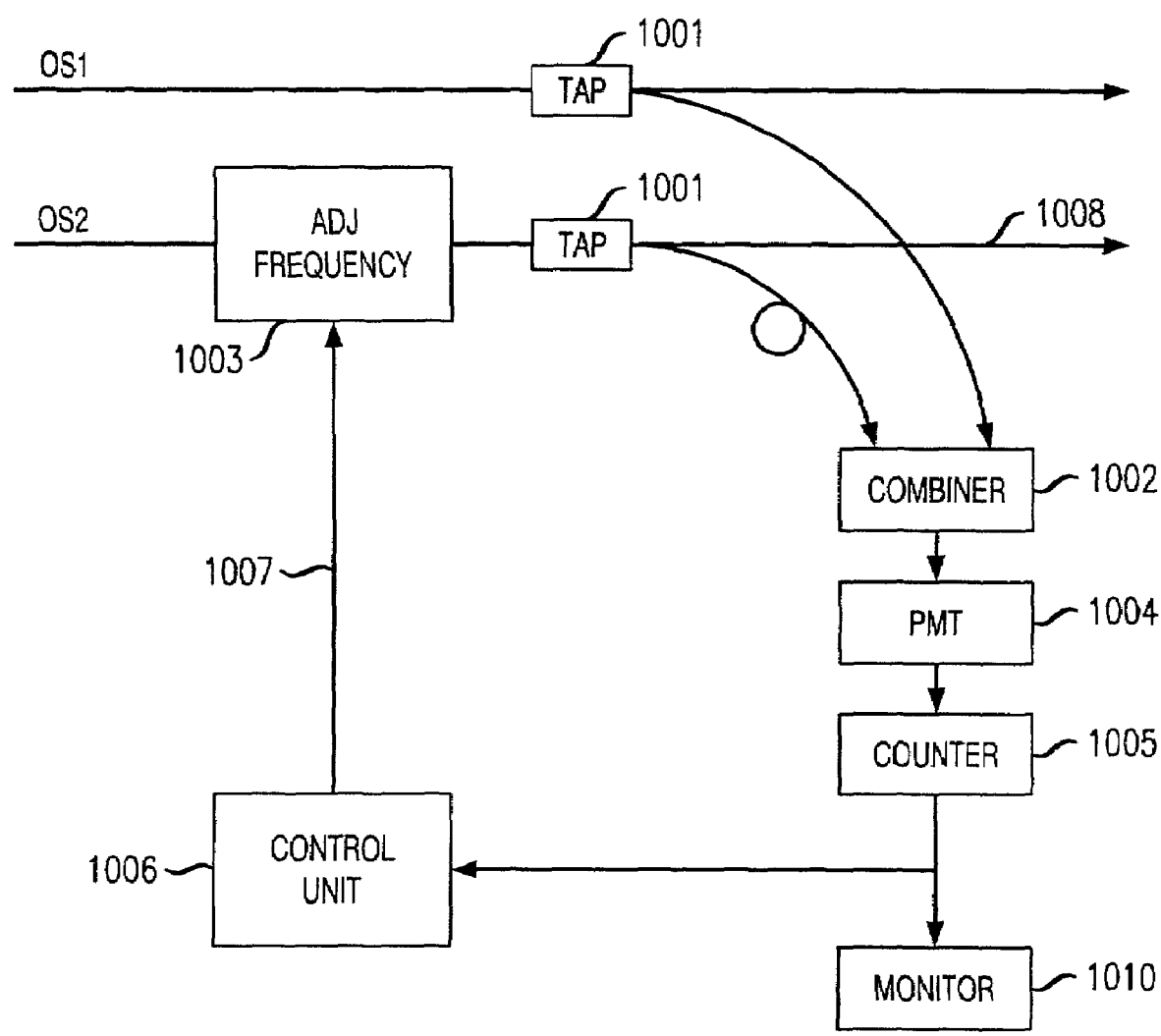
FIG. 8 shows PMT apparatus arranged in accordance with the present invention for optical clock recovery.

FIG. 8 shows another variation of the above device, TPA can also be used as an optical mixer device. Just like conventional RF mixers, in this case, the pulse repetition rates (i.e., data rate) of OS1 and OS2 are compared and their difference can be extracted. As an example, we assume that OS2 is an optical signal with a sinusoidal intensity modulation at a frequency that is close to the repetition rate of OS1. This sinusoidal intensity modulation can be achieved with an intensity modulator. A portion of the OS1 signal is split-off by tap 1001 and applied to a first input of combiner 1002. The OS2 signal passes through a variable frequency circuit 1003 and is applied to a second input of combiner 1002. The combiner 1002 combines the two input signals and applies them to PMT 1004. The TPA rate output from counter 1005 is applied to a control unit 1006, which includes a processor and control logic or software which generates an adjustable frequency control signal on output 1007, which controls the modulation frequency of the OS2 signal. Control unit 1006 is arranged to adjust the modulation frequency circuit 1003 so as to minimize the AC component of the TPA rate from counter 1005. The result is an output optical signal OS2 1008 that is modulated at a frequency that is identical to the repetition rate of OS1. To persons who are skilled in the art, such a device is an optical clock recovery circuit, which is very valuable in high data rate transmissions.

The PMT synchronization apparatus of FIG. 7 or 8 may be incorporated as part of the transmitter, repeater(s), and receiver units of an optical network to synchronize local clock signals to the received optical signals. The apparatus of FIG. 7 or 8 may also be used in other applications, where the coincidence of two optical pulses needs to be determined.

While the foregoing description of our arrangement used two-photon absorption of a 1.0–1.8 μm optical signal using a GaAs photomultiplier module, it should be repeated here that the PMT may be used for detecting more than two-photons of an optical signal having an upper wavelength range greater than 1.8 μm. For example, the PMT may be used for three-photon detection of an optical signal having an upper wavelength range to about 2.7 μm. Four-photon detection would extend the upper wavelength range of the optical signal beyond 3.6 μm, and so forth. It should also be noted that for a given power level, the detected TPA rate by the PMT decreases with the number of simultaneous photons being absorbed, thus the three-photon rate is typically less than the two-photon rate, etc. Furthermore, the use of a photon-counting technique is not necessary when the two-photon signal is large; in that event, an analog integration method of measuring or counting the two-photon signal may be more appropriate.

What is claimed is:

1. Apparatus for determining at least one characteristic of an input optical signal comprising
   a GaAs photomultiplier module (PMT) including a photomultiplier tube for detecting at least two-photon absorption (TPA) of said optical signal wherein said PMT having negligible 1-photon absorption,
   means for measuring the TPA response,
   means responsive to said measuring means for determining a characteristic of the optical signal using said TPA response, and
   means for generating a feedback signal used for correcting a signal impairment of said optical signal, wherein the feedback signal adjusts the amount of compensation in an impairment compensation device.

2. The invention defined in claim 1 wherein said optical signal has a wavelength in the range between 1.0 μm and extending to an upper wavelength that increases as the number of photons simultaneously absorbed by said PMT increases beyond two.

3. The invention of claim 1 wherein said characteristic includes said signal impairment of said optical signal.

4. The invention of claim 3 wherein the optical signal is an optical pulse communication signal and wherein said signal impairment is selected from a group including (a) noise, (b) group velocity dispersion, and (c) polarization mode dispersion.

5. The invention of claim 1 wherein said optical signal is received from a laser.

6. The invention of claim 1 wherein said optical signal is received via a WDM optical transmission link.

7. Apparatus for correcting at least one impairment in an input optical signal comprising
   means for compensating for at least one impairment in the input optical signal,
   a photomultiplier module (PMT) including a photomultiplier tube having a photocathode material that exhibits strong N-photon absorption, but negligible 1-photon absorption, within the wavelength region of interest, for detecting N-photon absorption of said optical signal,
   means responsive to said PMT for measuring the N-photon response, and
   means responsive to said measuring means for generating a feedback signal used for correcting said impairment in said optical signal, wherein the feedback signal adjusts the amount of compensation in the compensating means.

8. The invention defined in claim 7 wherein said PMT includes a GaAs photomultiplier.

9. The invention defined in claim 7 wherein said impairment is group velocity dispersion (GVD) and/or polarization mode dispersion (PMD).

10. Apparatus for correcting at least one impairment in an input optical signal comprising
   a plurality of compensators for providing a variable amount of compensation to said optical signal in response to a feedback control signal,
   a signal sampling device for sampling a predetermined portion of the output of said compensator,
   a GsAs photomultiplier module (PMT) including a photomultiplier tube responsive to the output of said signal sampling device for detecting at least two-photon absorption (TPA) of said portion of said compensator output, having negligible 1-photon absorption,
   a counter responsive to said PMT for generating a TPA rate signal in response to the detected TPA of said portion of said compensator output,
   a switch unit for selecting one of a plurality of feedback control units for operation, and
   the plurality of feedback control units responsive to said TPA rate signal for generating said feedback control signal.

11. The invention defined in claim 10 wherein said impairment is PMD, GVD or noise.

12. The invention defined in claim 10 wherein said apparatus is located at one or more communication units of an optical network including a transmission unit, a repeater unit, and a receiver unit of said network.

13. The invention defined in claim 10 wherein said compensator is arranged to alternately correct, in successive time intervals, each of two different impairments.

14. Apparatus for synchronizing a first optical pulse stream with a second optical pulse stream, comprising
   a delay element for providing a variable amount of delay to said first optical pulse stream in response to a control signal,
   a signal sampling device for sampling a predetermined portion of the output of said delay element,
   a combiner for combining said predetermined portion of the output of said delay element with a portion of said second optical pulse stream,
   a GaAs photomultiplier module (PMT) responsive to the output of said combiner for detecting at least two-photon absorption (TPA) of said combiner output,
   a counter responsive to said PMT for generating a TPA rate signal in response to the detected TPA of said combiner output, and
   a control unit responsive to said TPA rate signal for generating said control signal.

15. Apparatus for synchronizing a first optical pulse stream with a second optical pulse stream, comprising
   a frequency adjusting element for controlling the modulation frequency of a first optical pulse stream in response to a control signal,
   a signal sampling device for sampling a predetermined portion of the output of said frequency adjusting element,
   a combiner for combining said predetermined portion of the output of said frequency adjusting element with a portion of said second optical pulse stream,
   a GaAs photomultiplier module (PMT) responsive to the output of said combiner for detecting at least two-photon absorption (TPA) of said combiner output,
   a counter responsive to said PMT for generating a TPA rate signal in response to the detected TPA of said combiner output, and
   a control unit responsive to said TPA rate signal for generating said control signal.

* * * * *